(12) United States Patent
Menze

(10) Patent No.: US 6,262,553 B1
(45) Date of Patent: Jul. 17, 2001

(54) CONTROL FOR MATERIAL SPREADERS

(75) Inventor: Peter C. Menze, Marquette, MI (US)

(73) Assignee: M. P. Menze Research & Development Inc., Marquette, MI (US)

( * ) Notice: Subject to any disclaimer, the term of this patent is extended or adjusted under 35 U.S.C. 154(b) by 0 days.

(21) Appl. No.: 09/290,297

(22) Filed: Apr. 13, 1999

(51) Int. Cl.[7] .............................. G05B 1/06; E01C 19/20
(52) U.S. Cl. ..................... 318/663; 318/446; 239/677; 239/687
(58) Field of Search .................... 318/16, 139, 410–448, 318/663, 254, 565; 307/112; 388/824; 239/675–689, 661, 603, 650; 414/523, 526; 222/1, 55

(56) References Cited

U.S. PATENT DOCUMENTS

| | | | |
|---|---|---|---|
| 3,677,540 | * | 7/1972 | Weiss ..................... 222/23 |
| 3,679,098 | * | 7/1972 | Weiss ..................... 222/23 |
| 4,105,938 | * | 8/1978 | Mathews, Jr. ................ 318/599 |
| 4,132,941 | * | 1/1979 | Sousek et al. ............... 318/663 |
| 4,166,581 | * | 9/1979 | Hetrick .................... 239/683 |
| 4,461,984 | * | 7/1984 | Whitaker et al. ............. 318/640 |
| 4,495,421 | * | 1/1985 | Endo et al. ................. 250/551 |
| 4,668,898 | * | 5/1987 | Harms et al. ................ 318/254 |
| 4,779,031 | * | 10/1988 | Arends et al. ............... 318/565 |
| 4,784,563 | * | 11/1988 | Esh et al. .................. 414/523 |
| 4,786,822 | * | 11/1988 | Steely ..................... 307/125 |
| 4,851,969 | * | 7/1989 | Davenport et al. ............ 362/61 |
| 5,038,088 | * | 8/1991 | Arends et al. ............... 318/565 |
| 5,201,023 | * | 4/1993 | Motzko ..................... 388/824 |
| 5,389,823 | * | 2/1995 | Hopkins et al. .............. 307/10.1 |
| 5,447,272 | * | 9/1995 | Ask ........................ 239/7 |
| 5,498,910 | * | 3/1996 | Hopkins et al. .............. 307/10.1 |
| 5,519,253 | * | 5/1996 | Lake et al. ................. 257/724 |
| 5,842,649 | * | 12/1998 | Beck et al. ................. 239/677 |
| 5,904,296 | * | 5/1999 | Doherty et al. .............. 239/61 |
| 5,911,362 | * | 6/1999 | Wood et al. ................. 239/1 |
| 5,932,942 | * | 8/1999 | Patyk et al. ................ 310/58 |
| 5,947,391 | * | 9/1999 | Beck et al. ................. 239/677 |
| 5,950,934 | * | 9/1999 | Podesta et al. .............. 239/663 |
| 5,998,884 | * | 12/1999 | Kitamine et al. ............. 307/10.1 |
| 6,000,577 | * | 12/1999 | Nystrom .................... 222/1 |
| 6,005,314 | * | 12/1999 | Fisher et al. ............... 310/68 |
| 6,011,331 | * | 1/2000 | Gierer et al. ............... 310/58 |
| 6,089,478 | * | 7/2000 | Truan et al. ................ 239/675 |

\* cited by examiner

Primary Examiner—Paul Ip
(74) Attorney, Agent, or Firm—Oppenheimer, Wolff & Donnelly LLP

(57) ABSTRACT

The present invention is a control system for a vehicle that utilizes a powered attachment such as a material spreader. Such a device requires the use of a high current drawing motor, which in turn requires the ability to control the flow of high amperage current. The high current switching circuitry is mounted on or near the electric motor to prevent the heat generated by the circuitry from posing any type of hazard. A low current control is placed within the cab of the vehicle and serves to remotely control the switching circuitry.

1 Claim, 4 Drawing Sheets

CONTROL FOR MATERIAL SPREADERS

BACKGROUND OF THE INVENTION

1. Field of the Invention

This invention relates generally to controls for accessories attached or mounted to vehicles and more specifically to a cab mounted control for controlling a high current power source for an electric motor which drives an accessory such as a spreader for sand or salt that is coupled to a vehicle.

2. Description of the Related Art

There are many devices that are coupled with a vehicle that require a separate motor to control and operate the device. For instance, a spreader is often mounted on a vehicle to aid in the deposition of granular material such as salt, seed, fertilizers, chemical agents, sand or the like onto a surface as the vehicle travels over it. The spreader is connected to a material supply bin, which is usually gravity fed. As the material falls through the spreader, its is distributed by an auger or similar driving device. The auger is powered by an electric motor which is controlled by the operator in the cab of the vehicle. The operator can start, stop and control the speed of the spreader by so controlling the motor. The speed of the spreader controls the distribution characteristics of the material being spread.

Traditionally, the electric motor requires a relatively high current power source to adequately drive the spreader. Therefore, the motor control circuitry employed must be able to handle such a high current load. Obviously, any type of circuitry capable of handling such a level of current is appropriate. Generally, the power control circuit is mounted in the cab of the vehicle. The operator then actuates a control which will turn on, turn off and vary the speed of the electric motor by varying the amount of current which ultimately reaches the motor.

While this arrangement provides all of the necessary control the operator may require, it also creates several areas of concern. In order to make such an arrangement functional, relatively heavy gauge wire must be run through the firewall of the vehicle and into the cab. In and of itself, this is a modification which many vehicle owners may be hesitant to make as a correspondingly large hole must be cut. Furthermore, the cab and spreader are usually located on opposite ends of the vehicle. As such, a long length of this heavy gauge wire must be utilized. This adds significantly to the cost of such a system. In order to locate the power control circuitry remotely from the motor and driver device, rather large and very expensive high current handling electrical plugs must be utilized, further increasing the overall cost. These plugs are used to couple the high current wire to a control box that contains the MOSFET and also to couple the wire to a junction with the electric motor. In addition, the length of the wire reduces the efficiency of the system due to the voltage drop-off encountered. Finally, the size of the wire makes it difficult to conceal. As such, the exposed wire is subject to abrasions and inadvertent cutting.

The most significant concern, however, is the relatively large amount of heat that is generated by a MOSFET (or similar component) located within the cab of a vehicle, when handling high current loads. The heat generated by the control circuitry represents a fire hazard and severely limits the design parameters available during installation. Typically, the cab mounted circuitry occupies almost 2 square feet of space. It is difficult to place such a large device within the cab of a vehicle because the heat produced will often adversely affect the surrounding components. A large number of the items within the cab are made of plastic and are thus subject to melt. Wiring proximate the control circuit can also be damaged by the heat and thus short circuit. This causes obvious mechanical/electrical problems and also creates a risk of fire. If the circuitry can be mounted in a location that does not affect components in the cab, it will prevent the operator from being able to fully utilize the cab. That is, anything brought into the cab must be carefully placed to avoid contact with the control circuit.

As such, the heat generated by previous power control circuits is of significant concern. There has been no way to minimize this heat generation as those components which can handle the required current levels must necessarily dissipate this heat in some manner. Presently, such systems must simply be installed within the cab of the vehicle, in a location which hopefully minimizes the exposure of sensitive elements to the high levels of heat generated. The heat is simply allowed to dissipate into the surrounding air. Such installation presumes that the airflow within the cab will be sufficient to prevent the control circuitry from overheating. This is often incorrect, and as a result, the control circuitry may be prone to overheating, thus amplifying the above described concerns. Since the space inside the cabs of vehicles is so limited, the placement of the control is extremely problematic. As a result, vehicle owners must risk serious damage to their vehicles and forego the use of significant amounts of space within the cab in order to simply control an attachment which is mounted on the vehicle.

Therefore, there exists a need to provide an accessory control unit for high current drawing vehicle accessories that is electrically efficient and thermally isolated.

SUMMARY OF THE INVENTION

The present invention places all the high current switching circuitry within the accessory at or near the electric motor. A low current control line is run from the cab of the vehicle to the switching circuitry, thus giving the operator full control over the electric motor without having the physically intrusive high current wires inside the cab of the vehicle. Since the power is brought directly to the motor, as opposed to a long control line run, the system is more efficient.

Locating the switching circuitry within the accessory prevents the heat generated by the circuitry from posing any hazard within the cab of the vehicle. In addition, the circuitry can be directly connected to the casing of the electric motor. Generally, the casing is an aluminum shell, which acts as a heat sink to the switching circuitry. The circuitry can be placed on the inside of the motor casing to conserve space. Alternatively, the circuitry can be mounted to the outside of the motor casing, or even adjacent to it, thus allowing the present system to be more easily retrofit into existing devices.

In one embodiment of the present invention, a MOSFET is used to control the high current flow to the electric motor. The MOSFET is mounted on the inner wall of the motor casing. A low current control within the cab actuates the MOSFET, which in turn controls the flow of current to the electric motor. In a preferred embodiment, a photovoltaic isolator is used to control the MOSFET. The photovoltaic isolator includes a variable LED and a photovoltaic generator. The intensity of the LED is varied by the cab control. The LED is located proximate to the photovoltaic generator that is coupled to the gate of the MOSFET. As the intensity of the light emitted by the LED increases, the photovoltaic generator increases the voltage at the gate, thus controlling the MOSFET in a known way. Alternatively, the MOSFET may be controlled directly through the actuation of a variable resistor or similar element, which directly controls the voltage generated at the gate.

DETAILED DESCRIPTION OF PREFERRED EMBODIMENTS

Figure 1:
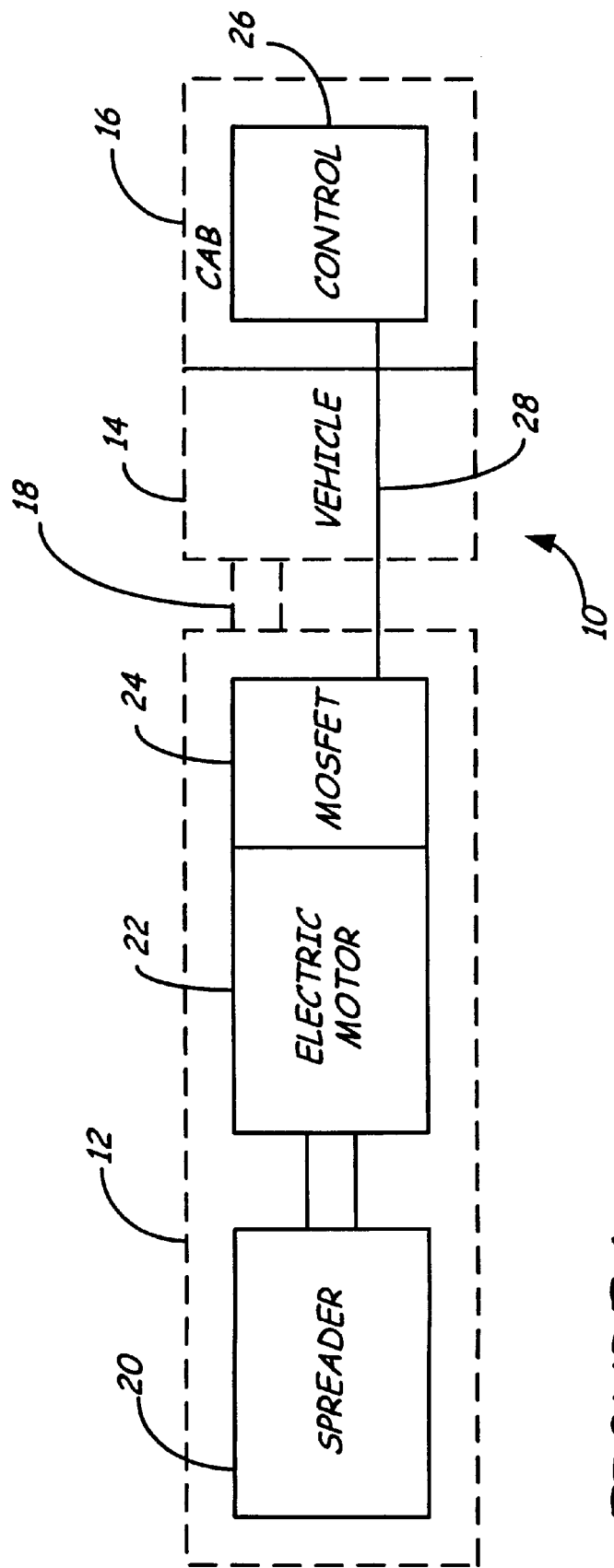
FIG. 1 is a block diagram representing the control system of the present invention coupled with a vehicle.

FIG. 1 illustrates the control system 10 as it is coupled with a vehicle 14 and an accessory. The vehicle 14 is representative of any type of vehicle to which a powered material handler, such as spreader 20, may be attached. The vehicle 14 can range from a small personal vehicle, such as a pickup truck, to a larger commercial vehicle such as a dump truck used by road servicing crews. A housing 12 containing the accessory is coupled to the vehicle 14. This connection is represented by coupling 18. The housing 12 could be mounted directly to the vehicle as either a permanent or removable attachment or could simply be pulled behind as a trailer. Within the housing 12 is the actual spreader 20. The spreader 20 includes some form of material handling device, such as an auger and is attached to a material supply container (either within the spreader 20 or within the vehicle 14). An electric motor 22 is mounted within the spreader 20 and has a drive shaft 34 (FIG. 2) which is coupled to the material handling device. A high current switching circuit, such as MOSFET 24, is mounted on the electric motor 22.

A control 26 is mounted within the cab 16 of the vehicle 14. The control 26 is electrically connected to MOSFET 24 with a relatively thin, low current control line 28. The control 26 allows an operator to turn the electric motor 22 on, off and vary its speed by controlling the MOSFET 24, which in turns controls the amount of current supplied to the motor 22.

Figure 2:
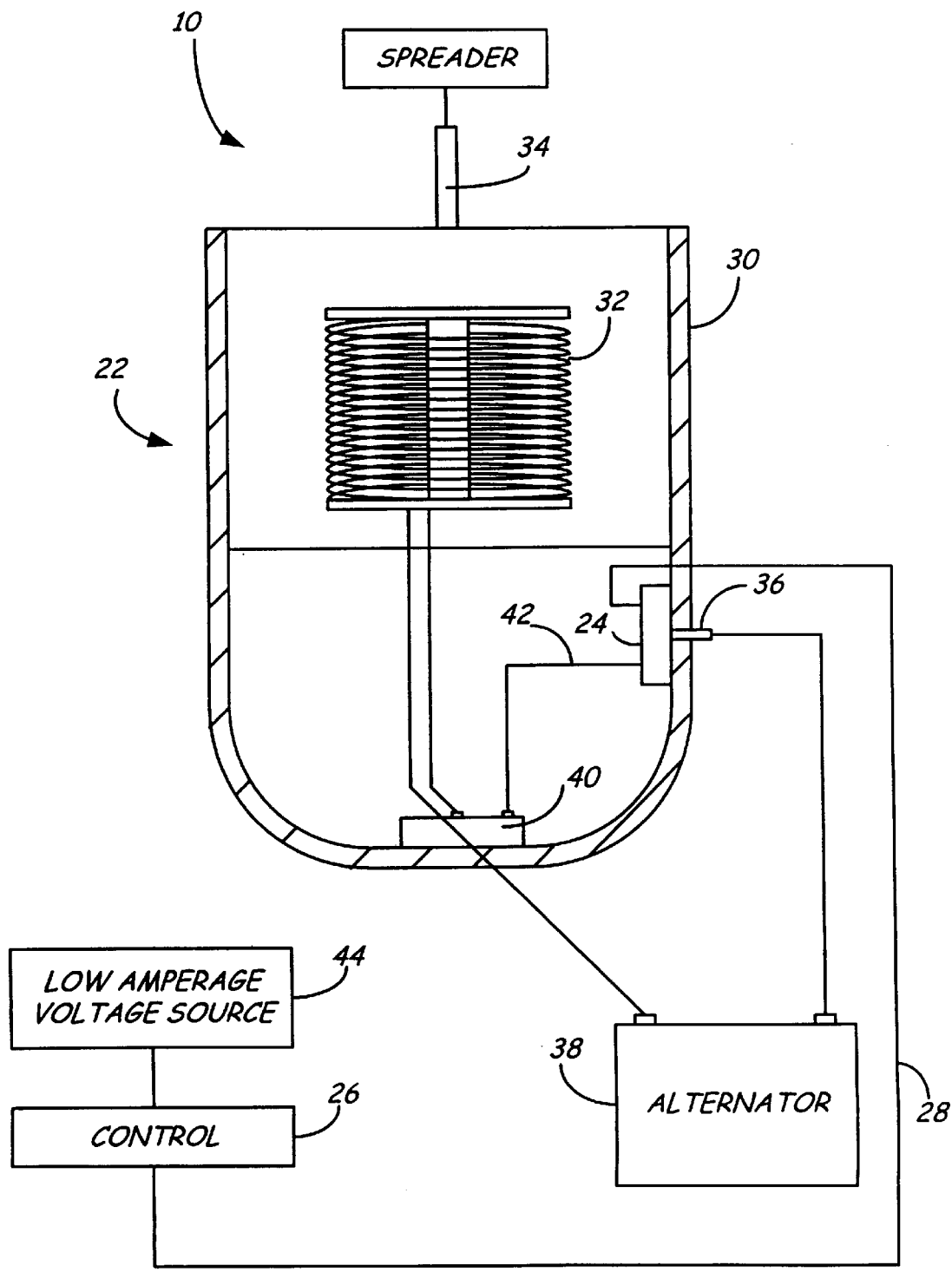
FIG. 2 is schematic drawing of the control system with the circuitry mounted within the housing of an electric motor (shown in cross section).

FIG. 2 schematically illustrates the control system 10 of the present invention in its most preferred form. High amperage current is supplied to the electric motor 22 by an alternator 38 (or similar power supply). Current is ultimately delivered to the coils 32 of the electric motor 22, which in turn causes the drive shaft 34 to rotate and deliver motive force to the actual spreader itself. The positive feed of the alternator 38 is coupled to the positive terminal 36 of the MOSFET 24. The MOSFET 24 is of sufficient capacity to handle the high current load. In a preferred embodiment, the MOSFET 24 has a 100 Amp capacity. The positive output of MOSFET 24 is coupled, via positive lead 42, through junction 40 to the motor coil 32. The MOSFET 24 is flushly mounted to an inner side of the aluminum motor housing 30, which acts as a heat sink for the MOSFET 24. The positive terminal 36 of the MOSFET 24 extends through the motor housing 30. Alternatively, the MOSFET could be mounted to the outer surface of the electric motor 22. This makes installation easier and allows this system to be retrofit into existing devices. Control 26 receives power from a low current power supply 44. The control 26 is coupled to the MOSFET 24 via control line 28. As the control 26 is varied, the amount of current that flows from the alternator 38, through MOSFET 24 and ultimately to the coils 32 is correspondingly varied. while it is preferable to mount the MOSFET 24 to an inner surface of the motor 22, it is to be understood that the present invention contemplates locating the MOSFET 24 (or equivalent circuitry) anywhere proximate the electric motor 22. That is, MOSFET 24 can be mounted on an outer surface of the motor 22 or on a structure located proximate to the motor 22, so long as the efficiency of the circuit is maintained, heat generation is controlled, and the cab controls are connected remotely via a low current control line.

Figure 3:
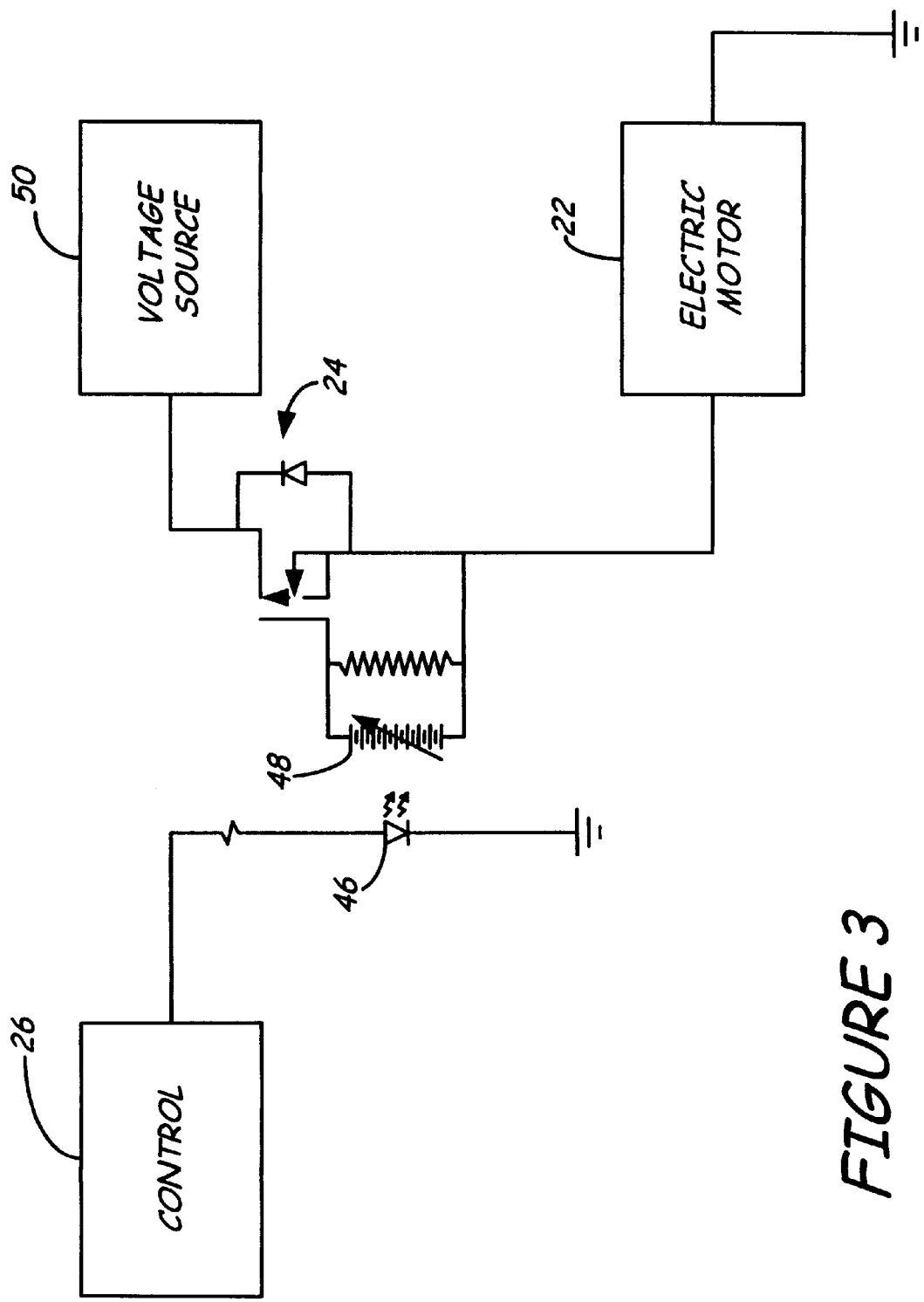
FIG. 3 is a circuit diagram of the control system of the present invention utilizing a photovoltaic controller.

FIG. 3 is a circuit diagram illustrating one way of controlling electric motor 22 using a photovoltaic isolator. The photovoltaic isolator includes LED 46 and photovoltaic generator 48. One example of such a photovoltaic isolator is that produced by International Rectifier, Series PVI, particularly the PVI 1050 or the PVI 5100. Control 26 serves to control the amount of current reaching LED 46. As such, the control 26 will turn on, turn off and vary the intensity of LED 46. As is known, LED 46 will only require a minimal current supply. The LED 46 is located proximate to a photovoltaic generator 48. As the LED 46 varies in intensity, the photovoltaic generator 48 causes a corresponding variance in the voltage applied to the gate of the MOSFET 24. By controlling the voltage applied to the gate, the amount of current which flows from the voltage source 50 (such as alternator 38) to the electric motor 22 is also controlled. The combination of the LED 46 and the photovoltaic generator 48 also act as an isolator to physically separate the low current control line from the high current switching circuit.

Figure 4:
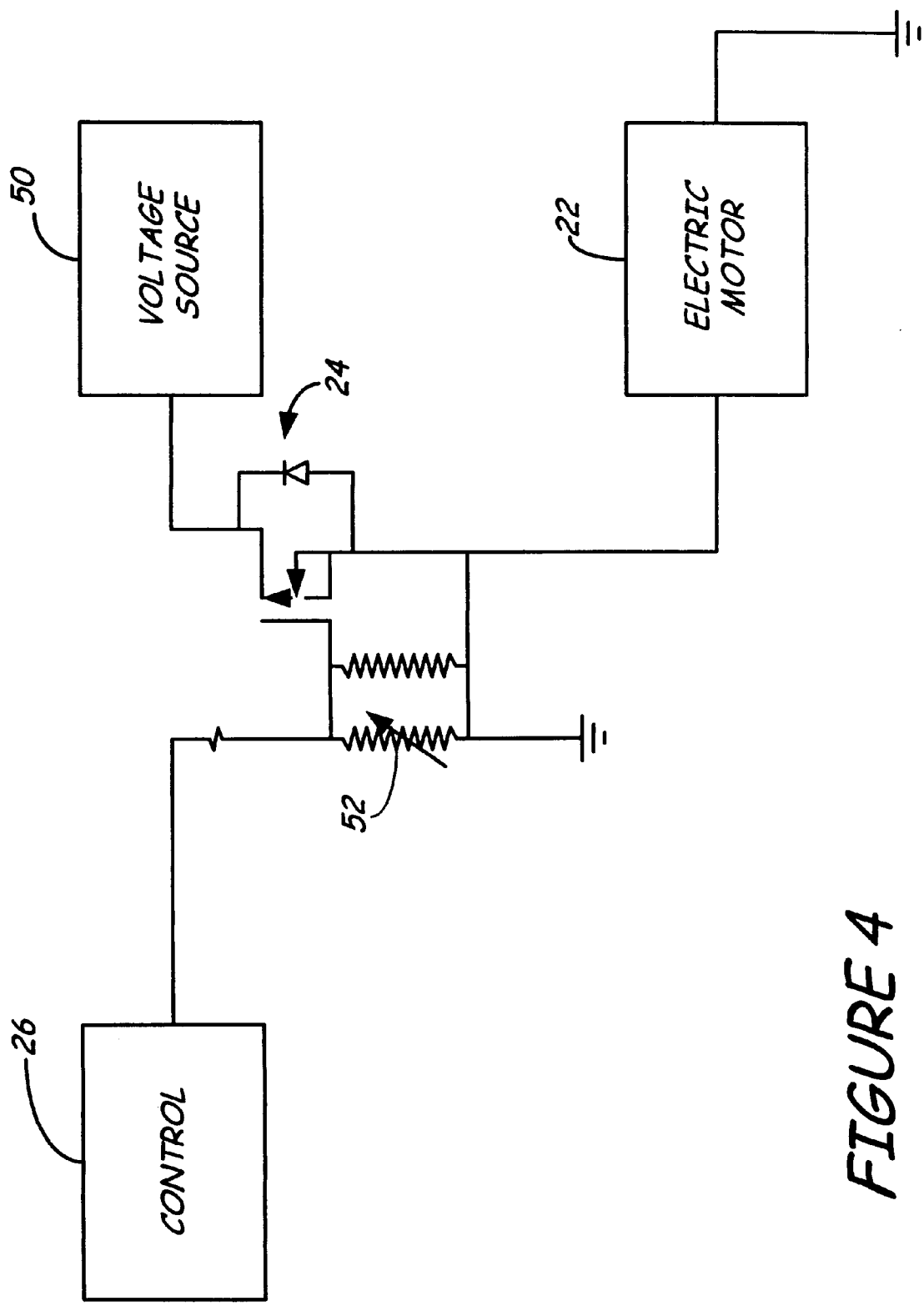
FIG. 4 is a circuit diagram of the control system of the present invention utilizing a variable resistor.

Alternatively, as shown in FIG. 4, a variable resistor 52 may be substituted for the LED 46/photovoltaic controller 48 combination. The variable resistor 52 is actuated directly by the controller 26, and varies the amount of low amperage current passing to ground. This may be accomplished in any of the known ways, such as employing a rheostat, a potentiometer, or the like. Once again, by varying the amount of voltage applied to the gate of the MOSFET 24, the amount of current flowing from the voltage source 50 to the electric motor 22 is correspondingly varied.

While the above embodiments have been shown and described to include a MOSFET, the present invention contemplates the use of any type of high current switching circuitry. That is, by locating the switching circuitry close to the motor, and away from the cab, and remotely controlling the circuitry from the cab, the problems associated with any of these switching arrangements are minimized.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. control system for controlling an accessory system, the accessory system including an electric motor for supplying motive force to a driven component, wherein the accessory system is coupled to a vehicle, the control system comprising:

a high current power supply for supplying current to drive the electric motor thereby providing motive force to the driven component;

a switching circuit for selectively controlling the amount of current delivered from the power supply to the electric motor, the switching circuit being coupled to a housing of the electric motor wherein the housing acts as a heat sink for the switching circuit, the switching circuit including a MOSFET for handling high current loads, wherein the MOSFET selectively allows current to flow from the power supply to the electric motor;

a photovoltaic isolator including an LED and a photovoltaic generator located proximate the LED and operatively coupled to the MOSFET so that as the intensity of the LED increases the photovoltaic generator actuates the MOSFET so that a proportional amount of current is allowed to pass through the MOSFET; and a control, electrically connected to the switching circuit and mounted within a cab of the vehicle, coupled to the LED by a low current wire so that actuation of the control from within the cab of the vehicle causes the LED to vary in intensity thereby causing the photovoltaic generator to vary a corresponding amount which causes the MOSFET to allow a corresponding amount of current to pass to the electric motor, so that actuation of the control effectively controls the electric motor.

* * * * *